United States Patent [19]

Lopiccolo et al.

[11] 4,020,700
[45] May 3, 1977

[54] UNITARY FLUIDIC ANGULAR RATE SENSOR

[75] Inventors: Mario T. Lopiccolo, Southington; Max A. Schaffer, Fairfield; George A. Jachyra, New Haven, all of Conn.

[73] Assignee: United Technologies Corporation, Hartford, Conn.

[22] Filed: Feb. 25, 1976

[21] Appl. No.: 661,904

[52] U.S. Cl. .................................. 73/516 LM
[51] Int. Cl.² .................................. G01P 15/08
[58] Field of Search ........ 73/516 LM, 515; 29/407, 29/436, 469, 593

[56] References Cited

UNITED STATES PATENTS

| | | |
|---|---|---|
| 1,841,607 | 1/1932 | Kollsman .................. 73/516 LM X |
| 2,643,869 | 6/1953 | Clark .................................. 73/497 |
| 2,726,074 | 12/1955 | Ketchledge .................. 873/516LM |
| 3,205,715 | 9/1965 | Meek .......................... 73/516 LM |
| 3,581,578 | 6/1971 | Schuemann ........................ 73/515 |

*Primary Examiner*—James J. Gill

*Attorney, Agent, or Firm*—M. P. Williams

[57] ABSTRACT

The nozzle of an angular rate sensor which directs a stream of fluid toward a pair of temperature-dependent sensing resistor elements is formed in a major block which defines the chamber within which the sensing elements are also mounted, thereby to mitigate problems of aligning the jet with respect to the chamber and of aligning the sensing elements with respect to the nozzle. Within the casing, only the nozzle block, a diaphragm pump assembly, and an anvil need be mounted; these are secured by a lock nut, the pressure thereof being applied through a conical Belleville spring. A fine weld is used to hermetically seal the element, but the weld can be cut off without damage to the unit; so that by loosening the lock nut, the entire apparatus can be disassembled without destruction. Reference resistors, for a bridge to measure changes in the sensing elements, are mounted directly within the unit, to avoid bridge misbalances due to external connections.

10 Claims, 4 Drawing Figures

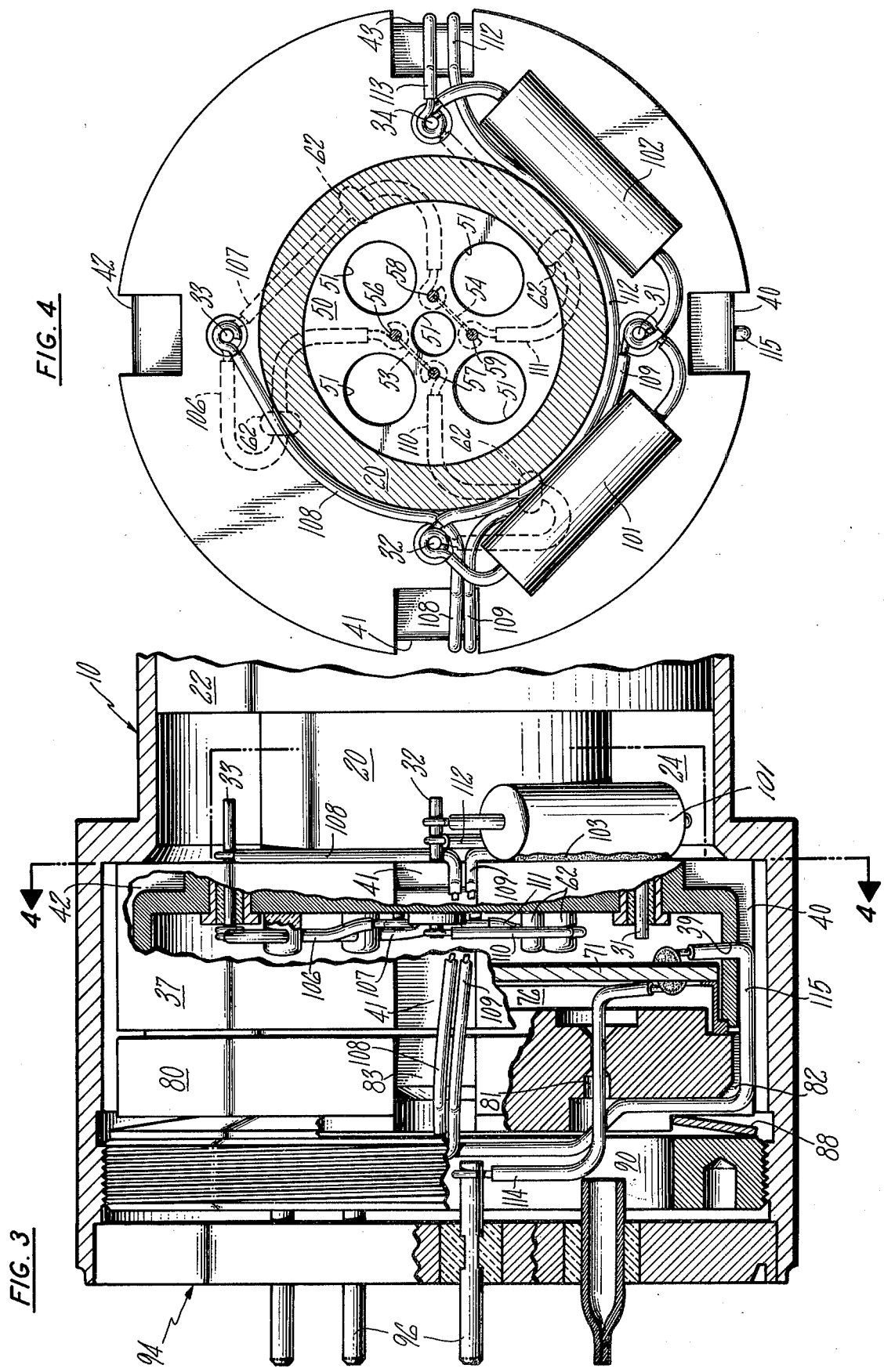

UNITARY FLUIDIC ANGULAR RATE SENSOR

BACKGROUND OF THE INVENTION

1. Field of the Invention

This invention relates to fluidic angular rate sensors and more particularly to improvements in the mechanical and electrical construction thereof.

2. Description of the Prior Art

Fluidic angular rate sensors known to the art are typified by those disclosed in U.S. Pat. Nos. 3,587,328, to Schuemann, and 3,626,765 to Moore et al. In fluidic angular rate sensors, a jet or stream of a suitable fluid, such as an inert gas, is provided by pressurized gas passed through a nozzle, the jet of gas being directed toward a pair of temperature-sensitive resistive elements which are differentially cooled by the jet whenever the jet is moved (such as in angular rotation) in a plane of sensitivity. The sensing elements are typically fine tungsten wires disposed on opposite sides of the centerline of the nozzle boresight. In the Schuemann patent, a vibrating diaphragm entrainment pump, in which the diaphragm is a piezoelectric crystal bimorph, provides the pressurization of the gas.

Fluidic angular rate sensors of this type have no moving parts except the vibrating diaphragm, and no rotating parts whatsoever. They are therefore theoretically capable of low cost manufacture, short start up time, and reliable operation after a long shelf life or storage period. However, the difficulty in manufacture and alignment of such devices, together with variations in operating characteristics over their life times and over variable temperature ranges, have rendered their utility less than complete. Low cost production is not achieved to an adequate extent due to inability for production line re-working of bad units, caused in part by the aggregate of variations in manufacture, in turn caused by numerous custom fittings, alignments and calibrations required in making each unit.

SUMMARY OF THE INVENTION

Objects of the invention include testing of an angular rate sensor which before being sealed in a casing; opening it after it is sealed, for repair or rework; fabricating it with a relatively simple assembly procedure; mitigating problems of calibration and errors due to the mechanical arrangements of electrical parts, eliminating problems of aligning a fluid jet nozzle with the fluid jet chamber in which the sensor elements are located; and reducing problems of aligning the sensor elements with the fluid jet nozzle.

According to the present invention, a unitary sensing structure comprises a nozzle block assembly having a fluid jet nozzle formed directly therein, and a sensor plug assembly accurately and firmly secured therein; this unitary structure facilitates alignment of the nozzle with the fluid jet chamber and alignment of the sensor elements with the fluid jet provided by the nozzle within the invention; this unitary assembly also permits initial testing and/or alignment thereof prior to being mounted in a casing within the invention. According further to the invention, the fluidic angular rate sensor has the components thereof mounted in a casing by means of pressure uniformly applied from a lock nut, whereby the components may be inserted into the casing for testing prior to provision of a hermetic seal to the casing; this facilitates pretesting and reworking on the assembly line as well as providing in part for the ability to open up and repair fluidic angular rate sensors made according to the invention. According still further to the invention, pressure of the lock nut is applied to components within the casing through a spring mechanism to avoid uneven application of pressure which could result from manufacturing tolerances. In accordance with the invention further, a fluidic angular rate sensor is provided with a lock nut to mechanically secure the components thereof in the casing, such that the hermetic seal need provide only fluid integrity and not mechanical integrity; in combination with the utilization of small weld lips and a relatively small bead weld, this facilitates cutting of the hermetic seal followed by release of the components from inside of the casing to permit repair of fluidic angular rate sensors, in accordance with the present invention.

According to another aspect of the present invention, all of the elements of an electrical bridge used to measure differences in the sensing elements, to provide an electrical indication of an angular rate being sensed, are mounted directly adjacent the sensors; this eliminates variations in long lead wires which may otherwise be included in the bridge configuration, and eliminates solder or other connections between the internal electrical components and external electrical components which would otherwise fall within the electrical bridge configuration; this aspect of the invention eliminates variations in manufacture and variations with temperature changes due to connections and differences in lengths and manufacturing tolerances of lead wires, and mitigates circuit differentials which might be caused by temperature variations between reference resistors and sensing elements in the sensing bridge. It also allows pretesting of the complete bridge before any part of it is sealed in the casing.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a partial side elevation, partially sectioned and broken away view of the fluidic angular rate sensor shown in FIG. 1; and FIG. 4 is a front elevation sectional view taken on the line 4—4 of FIG. 3.

DESCRIPTION OF THE PREFERRED EMBODIMENT

Figure 1:
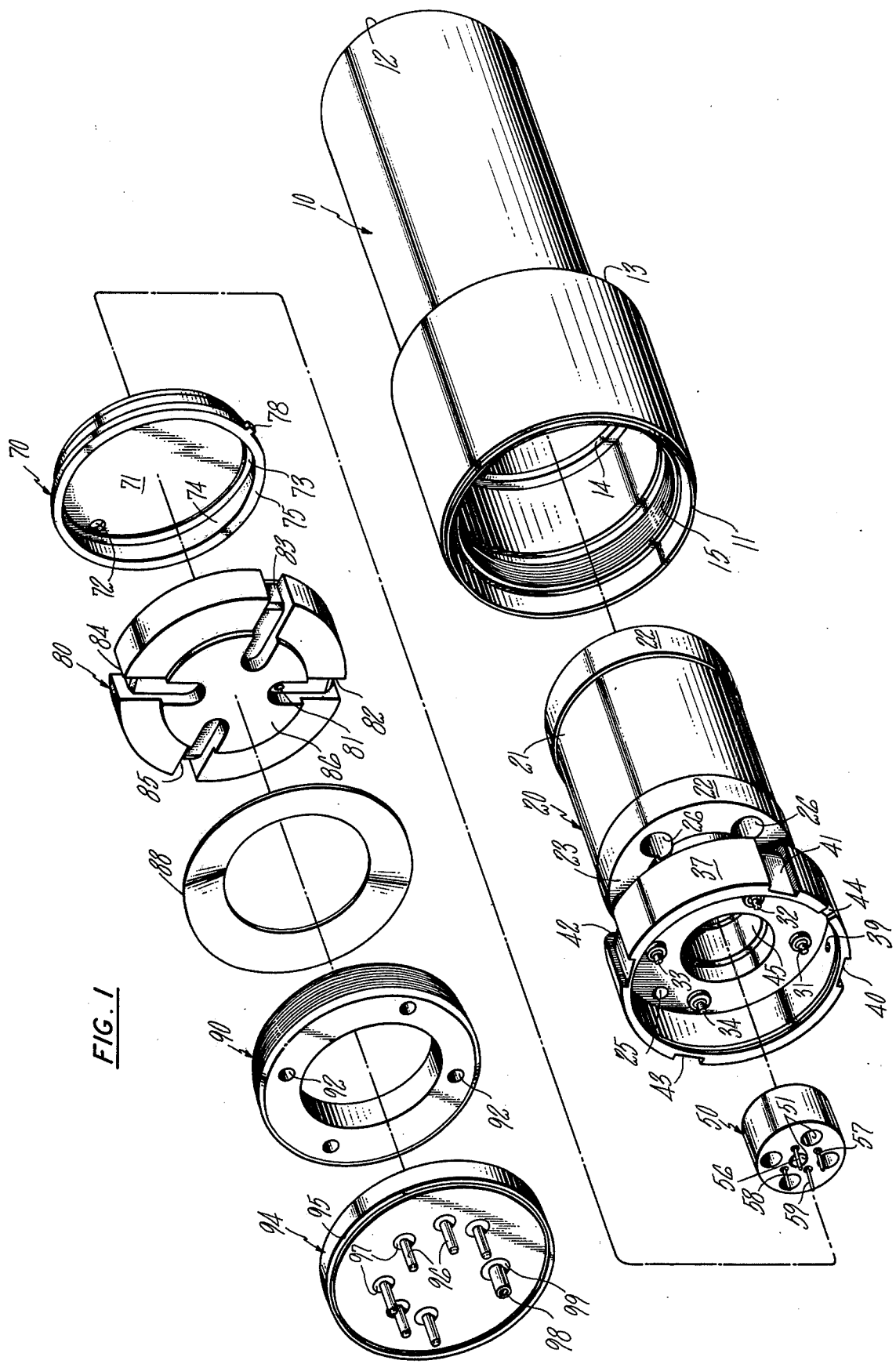
FIG. 1 is an exploded perspective view of the mechanical components of a fluidic angular rate sensor according to the present invention.
Figure 2:
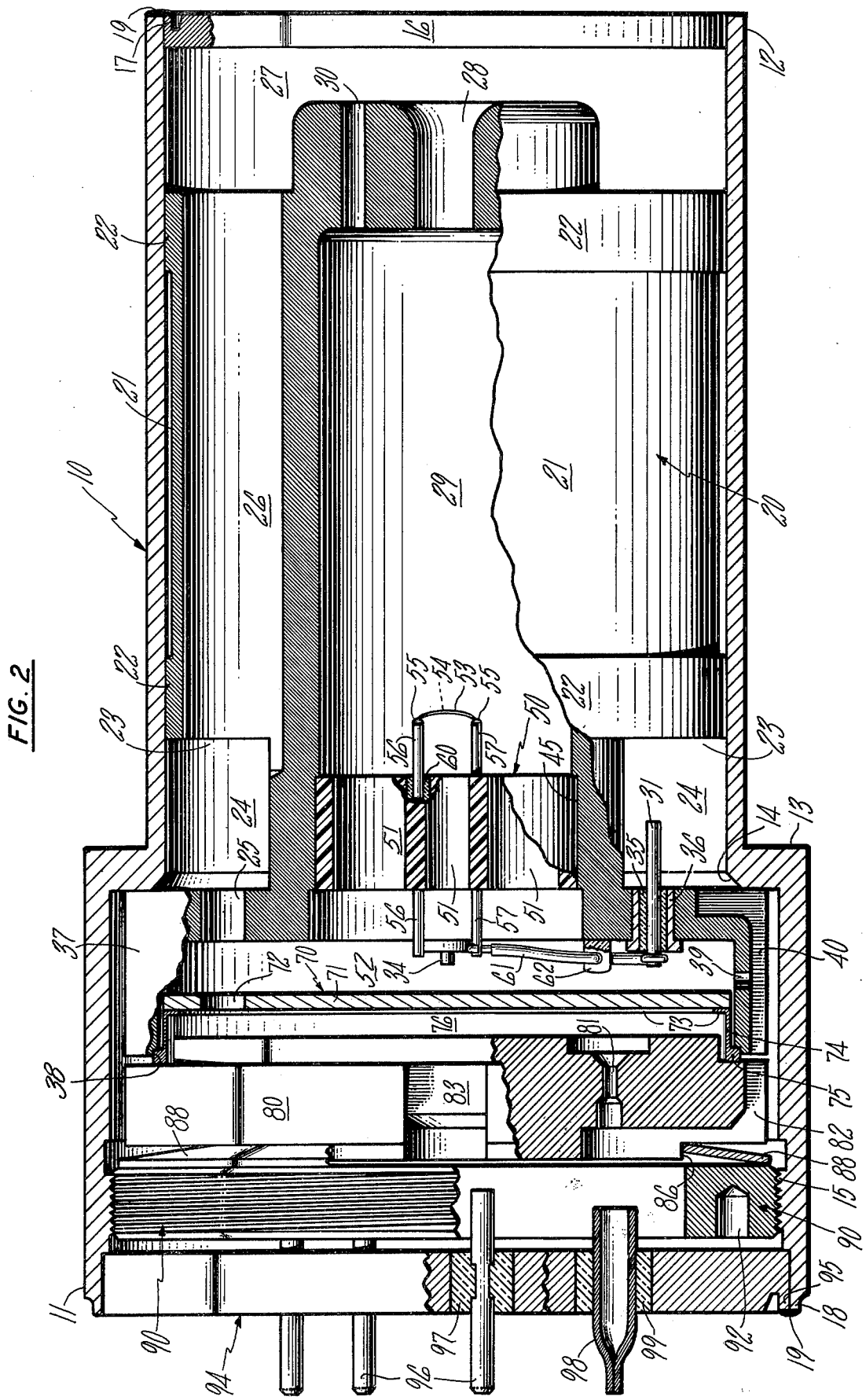
FIG. 2 is a partially sectioned, partially broken away side elevation illustrative view of the fluidic angular rate sensor shown in FIG. 1.

The sectional view of FIG. 2 is not strictly across a diameter, and is not completely accurate in terms of the relative rotation of the parts in comparison with FIG. 1, in order to more clearly illustrate the relationships of the invention. Referring now to FIGS. 1 and 2, a fluidic angular rate sensor, or gyro, according to the present invention comprises internal components housed in a casing 10 having a first, access end 11 and a closed end 12, and comprises a generally thin-walled cylinder of two diameters having a shoulder 13 therein. Internally, the shoulder 13 has a corner break 14 machined therein to reduce the chances of damaging insulated wires, as described more fully hereinafter. Near the access end 11, the casing 10 includes internal threads 15 for receiving a lock nut that secures components in place within the casing, as is described hereinafter. At its closed end 12, the casing comprises an end cover 16 (FIG. 2) which has a groove machined therein so as to form a weld lip 17 throughout its periphery; this facilitates welding the end cover 16 to the cylindrical wall of the casing 12 with a minimum of heat and material, thereby to provide a hermetic seal as well as structural integrity. At its open end 11, the casing outer diameter is reduced slightly so as to form a similar weld lip 18. The casing and other major components are preferably made of non-magnetic, anti-corrosive material which is easily welded at relatively safe temperatures, such as 300 series stainless steel. A bead weld 19 is preferred at both ends 11, 12, to facilitate being machined off for re-access.

The major component herein is a nozzle block 20, which, in this embodiment, is generally cylindrical in shape having two different overall diameters relating to the two different internal diameters of the case 10. A circumferential relief cut 21 is made so as to leave a pair of circumferential alignment bosses 22 of accurate diameter for aligning the nozzle block 20 within the casing 10. The nozzle block 20 has a major annular groove 23 formed therein, which together with the case 10 forms a fluid feed manifold chamber 24, which receives fluid under pressure from a fluid feed port 25 formed in a wall of the annular groove 23. The annular groove 23 leaves a shoulder which is mutually cooperative with the internal walls of the shoulder 13, to seat the nozzle block 20 within the casing 10. The nozzle block 20 is drilled in several places to provide fluid feed tubes 26 to conduct fluid under pressure from the feed manifold 24 to an inlet manifold chamber 27 formed in a void between the nozzle block 20 and the end cover 16. The nozzle block 20 also has a nozzle 28 formed therein which provides the stream or jet of fluid (typically an inert gas such as helium) leftwardly within a jet chamber 29 which is formed as a major axial bore within the nozzle block 20. Adjacent to the nozzle 28, there are a plurality (such as four or more) of fluid sleeve ports 30 which provide streams of fluid that form a sleeve, or curtain, of moving fluid around the jet provided by the nozzle 28, thereby to mitigate surface effects of the moving fluid within the jet.

The nozzle block 20 has four insulated feedthrough terminals 31-34, each of which (FIG. 2) has a glass insulator 35 fused between it and a metal mounting sleeve 36 for ease of insertion and bonding to the nozzle block 20, such as by an adhesive. The nozzle block 20 has a pump mounting flange 37 including an internal counterbore 38, a wire feedthrough hole 39 and a plurality of milled slots 40-43 used either for wire passageways or for an alignment key, as described hereinafter, as well as a pump alignment key notch 44 (FIG. 1), matching a key 78.

The nozzle block 20 also includes an accurately machined counterbore 45, having precisely the same axis as the nozzle 28, for receiving a sensor plug assembly 50 which may be secured to the counterbore 45 in any suitable way (such as adhesive) to form a unitary nozzle block assembly for accurate alignment of the nozzle and the sensors within the jet chamber 29. The sensor plug assembly 50 has a plurality of exhaust ports 51 formed therein to permit free and easy passage of the fluid stream therethrough from the jet chamber 29 into an exhaust chamber 52 (FIG. 2) formed within the pump mounting flange 37.

The actual sensing elements of the fluidic angular rate sensor of the present invention comprise a pair of temperature-sensitive resistance elements such as fine tungsten wires 53, 54 mounted, as by metallurgical bonding 55, to respective kovar posts 56, 57 and 58, 59. The kovar posts 56-59 are rigidly secured in the sensor plug assembly 50, in an insulated manner, by glass 60 (FIG. 2). The sensor wires make electrical contact with the outside world through wires (which are preferably insulated such as a wire 61 illustratively shown) soldered to the kovar post 59 and to the feedthrough terminal 31, and held in place, in a manner described with respect to FIGS. 3 and 4 hereinafter, by a blob or body of epoxy 62.

A pump assembly 70 includes a piezoelectric crystal bimorph 71 having a pump orifice 72, suitably bonded as by an adhesive to a mounting rim 73 of a crystal support flexure 74 which has an additional, oppositely directed support rim 75 which seats in the counterbore 38 of the nozzle block 20. As described in the aforementioned Schuemann patent, application of alternatng current power to opposite sides of the piezoelectric crystal bimorph 70 causes it to vibrate, so that there are large pressure pulsations within a pump chamber 76 formed internally of the crystal support flexure 74, which pulsations are forced through the pump orifice 72, creating a pressure concentration in the exhaust chamber 52 which in turn forces the fluid under pressure through the fluid feed port 25 and into the fluid feed manifold 24. This supplies the fluid under pressure through the feed tubes 26 to the inlet manifold chamber 27 for driving the nozzle 28 and the jet sleeve ports 30.

An anvil 80 is seated against the support rim 75 of the crystal support flexure 74 and is sufficiently thick so as to be able to withstand the large pressure pulsations which occur within the pump chamber 76, which is formed between it and the bimorph 71 of the pump assembly 70. The anvil has a wire feedthrough hole 81 therein to facilitate providing an electrical wire connection to the bimorph 71 as is described more fully hereinafter. The anvil 80 also has a plurality of milled wire clearance slots 82-85 which are complementary to the milled slots 40-43 in the nozzle block 20. The anvil 80 also has a boss 86 therein to assist in aligning a conical spring 88 (sometimes referred to as a Belleville spring). The pump assembly 70 and the anvil 80 thus comprise a pump means.

Pressure is applied to the conical spring 88 by an annular lock nut 90 which may be tightened within the internal threads 15 of the casing 10 by means of a well-known spanner wrench which is adapted to engage spanner holes 92. The conical spring 88 permits supplying a high degree of pressure to the anvil 80 by the lock nut 90 so as to firmly seat the anvil and the pump assembly to the nozzle block, even though there may be less than perfect alignment between the internal threads 15 and the shoulder 13 which could otherwise cause pressure to be applied more to one side than the other. The lock nut 90 and the conical spring 88 thus comprise a locking means to secure the components in the casing 10.

The casing 10 may be completely sealed at the access end 11 by means of a suitable metallic cover such as a glassed-terminal header 94 which is provided with a weld lip 95 to allow the header 94 to be bead-welded

(19) to the weld lip 18 of the casing 10, with a minimum of heat required (since the two weld lips have less mass than the full thickness of the casing or the header would have), and to also permit easy cutting away of the bead weld formed thereon to permit access into the inside of the casing 10 (as when repairs are necessary). The header 94 has a plurality of insulated feedthrough terminals 96, each of which comprises a conductor supported in, but insulated from, the heder 94 by glass 97. There is also a fill tube 98 which may, although it is not necessary, be disposed in the header 94 in a sleeve of fused glass 99. The fill tube 98 is of a well known type and serves simply to permit filling a completed angular rate sensor of the present invention with an inert gas, such as helium, and sealing of the unit in a simple fashion. Preferably, the tube 98 may be made of a suitable material, such as silver, to permit compression welding of the walls of the tube in the same process in which the tube is pinched off (as shown in FIG. 2). It may also be preferable to solder the tube shut so that the compression weld is not being relied on alone to ensure a seal over the storage and operational life of the unit.

Referring now to FIGS. 3 and 4 the arrangement of parts in one embodiment of the invention is shown with accuracy, insofar as rotational position is concerned. Therein, a pair of reference resistors 101, 102 are shown mounted within the major annular groove 23 of the nozzle block 20, they being adhered to the left wall (as viewed in FIG. 3) of the groove 23 by epoxy or other adhesive 103. The reference resistors 101, 102 are connected with the fine tungsten wires 53, 54, which act as the temperature-dependent sensing elements, in a standard measurement bridge configuration, which permits accurate measurement of the difference in the resistance of the tungsten wires 53, 54 so as to provide an indication of angular rate being sensed, as is described hereinbefore. The bridge is actually configured within the rate sensor, as seen in FIGS. 3 and 4, by electrical connections made from the tungsten wires 53, 54 and the reference resistors 101, 102 to the insulated feedthrough terminals 31–34. Specifically, one end of the tungsten wire 53 is connected by an insulated wire 106 to the feedthrough terminal 33, which is also connected by an insulated wire 107 to one end of the tungsten wire 54 such that the terminal 33 represents one of the null points of the bridge. Similarly, both resistors 101, 102 are connected to the feedthrough terminal 31 so that it represents the other null point of the bridge. A pair of insulated wires 108, 109 are fed through the milled slot 41 in the flange 37 and the milled slot 83 in the anvil 80 so as to permit interconnection of the null points (31,33), through respective ones of the feedthrough terminals 96 in the header 94 (the view of the connection of which is blocked in FIG. 3 by the lock nut), with the sensing means (such as an amplifier) mounted externally of the rate sensing element illustrated herein, so as to provide an electrical signal indicative of the angular rate being sensed, all as is known in the art and described in the aforementioned U.S. patents. The opposite ends of the tungsten wires 53, 54 are connected by respective insulated wires 110, 111 to corresponding feedthrough terminals 32, 34 along with the opposite ends of the sensing resistors 101, 102. Thus the feedthrough terminals 32, 34 become the driving points of the bridge which are connected by respective wires 112, 113, fed through the milled slot 43 in the flange 37 and the milled slot 85 in the anvil 80, to corresponding feedthrough terminals 96 in the header 94, for interconnection with a suitable DC power supply which is external of the device illustrated herein, as is known and described in the aforementioned U.S. patents.

Thus it is that the entire bridge configuration, including the sensing resistor elements 53, 54 and the reference resistor elements 101, 102 are fully interconnected within the unit itself, so that variations (size, length and temperature characteristics) in the lead wires and interconnections to the header 94 will not affect the bridge null, in contrast with rate sensors known to the prior art.

In order to drive the pump 70, a pair of wires 114, 115 are soldered to opposite sides of the bimorph 71, preferably near an edge thereof so as to provide a minimum of damping to the vibration of the bimorph 71. The wire 114 is fed through the hole 81 in the anvil 80, and (as is illustrated in FIG. 3) the hole 81 is sized so as to be substantially filled by the insulated wire 114, thereby to resist leakage of the pulsating gas in the pump chamber 76. Similarly, the wire 115 is fed through the hole 39 in the flange 37, the hole 39 being sized so as to be substantially blocked by the wire 115, thereby to avoid leakage of gas under pressure in the fluid feed manifold chamber 24 into the exhaust chamber 52. The wire 115 passes through the slot 40 in the flange 37 and through the slot 82 in the anvil 80 in order to gain access to the wiring compartment formed within the lock nut 90, for connection with one of the feedthrough terminals 96. In FIGS. 3 and 4, the slot 42 is illustrated as having no wires passing therethrough. If desired, in order to facilitate assemblage of the unit, and particularly the alignment of the wires, 108, 109, 112, 113 and 115 in the appropriate slots of the flange 37 and the anvil 80, a key may be inserted in the slot 42 of the flange 37 and in the slot 84 of the anvil 80 in order to align the anvil 80 properly with the nozzle block 20. This alignment, and alignment of the pump orifice 72 with the fluid feed port 25 are the only alignments required during assembly of the major parts into the casing 10.

The wires 106, 107 and 110, 111 that interconnect the tungsten sensing wires 53, 54 with the terminals 31–34 are held in place by blobs of epoxy 62; this is to route the wires so that they will not interfere with the free passage of gas through the exhaust ports 51 (FIG. 4) and to provide curvature in the wires for a certain amount of strain relief with respect to the kovar posts 56–59 so that temperature effects on the wires will not induce strains in the posts. The bodies or blobs of epoxy 62 are shown in a very neat fashion; however, the shape of these is not only irrelevant, it is also uncontrolled.

Differential cooling of the fine tungsten wires 53, 54 by the jet or stream of gas from the nozzle 28 provides resistance changes that are measured for an indication of the angular rate being sensed. Due to the positioning of the wires in this embodiment, the plane of sensitivity of the apparatus would be 45° as viewed in FIG. 4, from the upper left to the lower right, the plane being perpendicular to the sheet as viewed in FIG. 4. Alignment of the angular rate sensor so that the plane of sensitivity is in the proper place is achieved in whatever apparatus in which the angular rate sensor is mounted, wherein it is typically clamped to a chassis of some sort, such as the chassis which bears the power supply and the sensing amplifier. In fact, it is common for such angular rate sensors to be mounted in triads of three units so as to be able to measure angular rates in three different planes (such as north, east and up, or pitch, roll and yaw). This is well known and forms no part of the present invention.

Having described in detail hereinbefore the elements of the present invention, the purposes and advantages thereof are more easily understood. A first important aspect of the present invention is that it can be disassembled for repair, either during the original manufacturing and alignment process, or after use in the field. This is achieved by the combination of the lock nut 90 to secure the internal parts together and the simple bead weld 19 which hermetically seals the unit in a fashion which renders it relatively easily cut open again at the access end 11. The lock nut 90 takes all the mechanical strain, so that the weld 19 need merely present a simple hermetic seal. Turning of the unit on a lathe can cut away sufficient of the bead weld 19 at the access end 11 so as to gain access to the unit without damage to the header 94 or the casing 10. The utilization of the lock nut 90 is, in turn, made possible by the use of the Belleville spring 88 to apply an even pressure to the anvil 80, and also by the simplicity of the arrangement in which there are only three major components (the anvil 80, the pump assembly 70, and the sensor block assembly 20, 50) which must be secured within the casing 10. It is further made possible by the alignment bosses 22 of the nozzle block 20, which avoids any sideways motion of the nozzle block within the casing 10, so that no adhesive is required to retain these three major parts in place within the casing, and in suitable alignment with each other.

A second major aspect of the present invention, related to the first but distinct therefrom, is that the manner in which the nozzle block 20 accommodates the sensor plug 50, without any support of the sensor plug assembly 50 being furnished by the casing or other component, renders it possible to secure the sensor plug assembly 50 within the nozzle block 20, and, within a suitable test rig including a flow of helium gas through the nozzle 28, the operability of the nozzle with respect to the complete bridge can be tested outside of the casing 10. Furthermore, because of the manner of securing the parts within the casing 10, all of the components can be mounted in the casing and the lock nut 90 secured for in-case testing of the device, before welding it shut for the hermetic seal.

Another major aspect of the present invention is mounting of the reference resistors 101, 102 directly in the same unit as the sensing elements 53, 54, solder joints within the bridge are eliminated, and the length of wires between bridge elements are significantly reduced, so that any variations in the wiring leading from the rate sensor are not within the bridge, but are externally thereof; this in turn allows the whole bridge to be tested before any part of it (sensors) is sealed into the casing.

Another major aspect of the present invention is that the most critical alignment within the angular rate sensor is accommodated by having the sensors 53, 54 mounted in the sensor plug assembly 50 in a rigid fashion, and the sensor plug assembly in turn fitting snugly and securely in the accurately machined counterbore 45, which is long enough to accommodate complete seating of the entire sensor plug assembly 50. This is in contrast with the prior art wherein the sensor plug assembly, the jet chamber 29, and the nozzle 28 were not only made in three separate parts, they each were partly positioned against still other parts, and they are individually attached at relatively small surface areas by adhesives, such that their relative alignment could not be relied upon over any substantial life, and such that they were very sensitive to shock and to strains imparted to the casing and induced by temperature changes. Thus, even if the nozzle end of the nozzle block 20 were bolted onto the remainder thereof, the nozzle, the sensor and the chamber would still be able to be assembled without any need for support from the casing or other internal components, and tested as a subassembly before insertion into the casing 10.

A related aspect of the invention is that the alignment of the sensor plug assembly 50 with respect to the nozzle 28 is achieved with the nozzle 28 carefully aligned as to its axis with respect to the entire length of the nozzle block 20; in other words, since the nozzle is formed right in the nozzle block 20, there is no chance of the nozzle being skewed slightly with respect to the axis of the jet chamber 20, which could result in a significant lateral change in the position of the main stream of the jet as it reaches the sensor plug assembly. In contrast, having the sensor plug assembly mounted within the nozzle block (instead of formed as a part thereof) does not give rise to the same sort of errors, since any misalignment is not amplified over the entire length of the nozzle block 20 (as just described with respect to the nozzle).

Although the invention has been shown and described with respect to a preferred embodiment therefore, it should be understood by those skilled in the art that various changes, omissions and additions may be made therein and thereto without departing from the spirit and the scope of the invention.

Having thus described a typical embodiment of our invention, that which we claim as new and desire to secure by Letters Patent is:

1. In a fluidic angular rate sensor having a sealed casing filled with a gas, and internal components including a nozzle, pumping means for providing said gas under pressure to said nozzle to produce a stream of gas along an axis within a chamber, temperature sensitive resistive elements disposed in said chamber in the path of said stream for differential cooling by said stream as a function of said sensor experiencing an angular rotation in a plane of sensitivity, the improvement comprising:

internal threads in said casing near a first end thereof; and a threaded locking means comprising a lock nut engaging the internal threads of said casing and a conical spring interposed between said lock nut and one of said internal components for applying pressure against said internal components to secure them in said casing.

2. The improved fluidic angular rate sensor according to claim 1 wherein said nozzle, said chamber and said sensing elements consist of a unitary subassembly positioned in said casing farther from said first end than any other of said internal components, and said pumping means is disposed between said unitary subassembly and said locking means, the pressure of said locking means securely pressing said pumping means against said unitary subassembly, and thus said unitary subassembly against said casing.

3. The improved fluidic angular rate sensor according to claim 2 wherein said pumping means comprises an entrainment pump including a diaphragm disposed on an annular support, and a separate rigid anvil, forming a pump chamber with said annular support, said anvil contacting said locking means and said annular support, said annular support contacting said unitary structure.

4. The improved fluidic angular rate sensor according to claim 1 wherein said casing includes hermetic seal means disposed at said one end of said casing and including a metallic cover having a thin weld lip welded in a gas tight manner to said casing by a thin bead weld, thereby sealing said internal components and said locking means inside said casing.

5. In a fluidic angular rate sensor having a sealed casing filled with a gas, and internal components including a nozzle, pumping means for providing said gas under pressure to said nozzle to produce a stream of gas along an axis within a chamber, temperature sensitive resistive elements connected in a sensing bridge configuration and disposed in said chamber in the path of said stream for differential cooling by said stream as a function of said sensor experiencing an angular rotation in a plane of sensitivity, the improvement comprising:

a pair of reference resistors connected in said sensing bridge configuration and disposed in said casing within the path of gas flow from said pump to said nozzle and adjacent to said temperature sensitive resistive elements and directly connected thereto.

6. The improved fluidic angular rate sensor according to claim 5 wherein said nozzle, said chamber and said sensing elements consist of a unitary subassembly, said subassembly having a major annular groove therein, said reference resistors being mounted within and secured to one wall of said major annular groove.

7. In the method of fabricating and then disassembling a fluidic angular rate sensor having a sealed casing filled with a gas, and internal components including a nozzle, pumping means for providing said gas under pressure to said nozzle to produce a stream of gas along an axis within a chamber, temperature sensitive resistive elements connected in a sensing bridge configuration and disposed in said chamber in the path of said stream for differential cooling by said stream as a function of said sensor experiencing an angular rotation in a plane of sensitivity, the steps of:

first, forming a unitary subassembly including said nozzle, said chamber and said sensing elements;

second, inserting said subassembly into said casing;

third, applying a force on said subassembly relative to said casing to secure said subassembly to said casing;

fourth, covering an open end of said casing with a tightly-fitting metallic cover having a weld lip thereon and providing a thin bead weld to said weld lip and said casing so that said casing is hermetically sealed with said cover; and cutting away said bead weld and removing said cover from said casing to gain access to said internal components.

8. The method according to claim 7 wherein said third step includes inserting said pumping means into said casing in force-transmitting relationship with said subassembly, and applying said force to said pumping means.

9. The method according to claim 7 wherein said first step comprises:

forming a unitary subassembly including said nozzle, said chamber, said sensing elements and a pair of reference resistors electrically connected to said sensing elements in said sensing bridge configuration.

10. In a fluidic angular rate sensor having a sealed casing filled with a gas, and internal components including a nozzle, pumping means for providing said gas under pressure to said nozzle to produce a stream of gas along an axis within a chamber, temperature sensitive resistive elements disposed in said chamber in the path of said stream for differential cooling by said stream as a function of said sensor experiencing an angular rotation in a plane of sensitivity, the improvement comprising:

said chamber having said nozzle formed integrally within one of the walls thereof and having a counterbore of a given length along said axis formed at an end thereof opposite to the wall in which said nozzle is formed coaxially with said axis; and said sensing elements being disposed on a circular sensor plug assembly having a diameter and a length substantially the same as the diameter and length of said counterbore and disposed within said counterbore, said sensor plug assembly having gas passages therein parallel with said axis, such that said sensor plug assembly forms a wall of said chamber with said temperature sensitive resistive elements disposed thereon, said nozzle, said chamber and said sensing elements being thus formed as a unitary one of said internal components.

* * * * *